Patented July 7, 1931

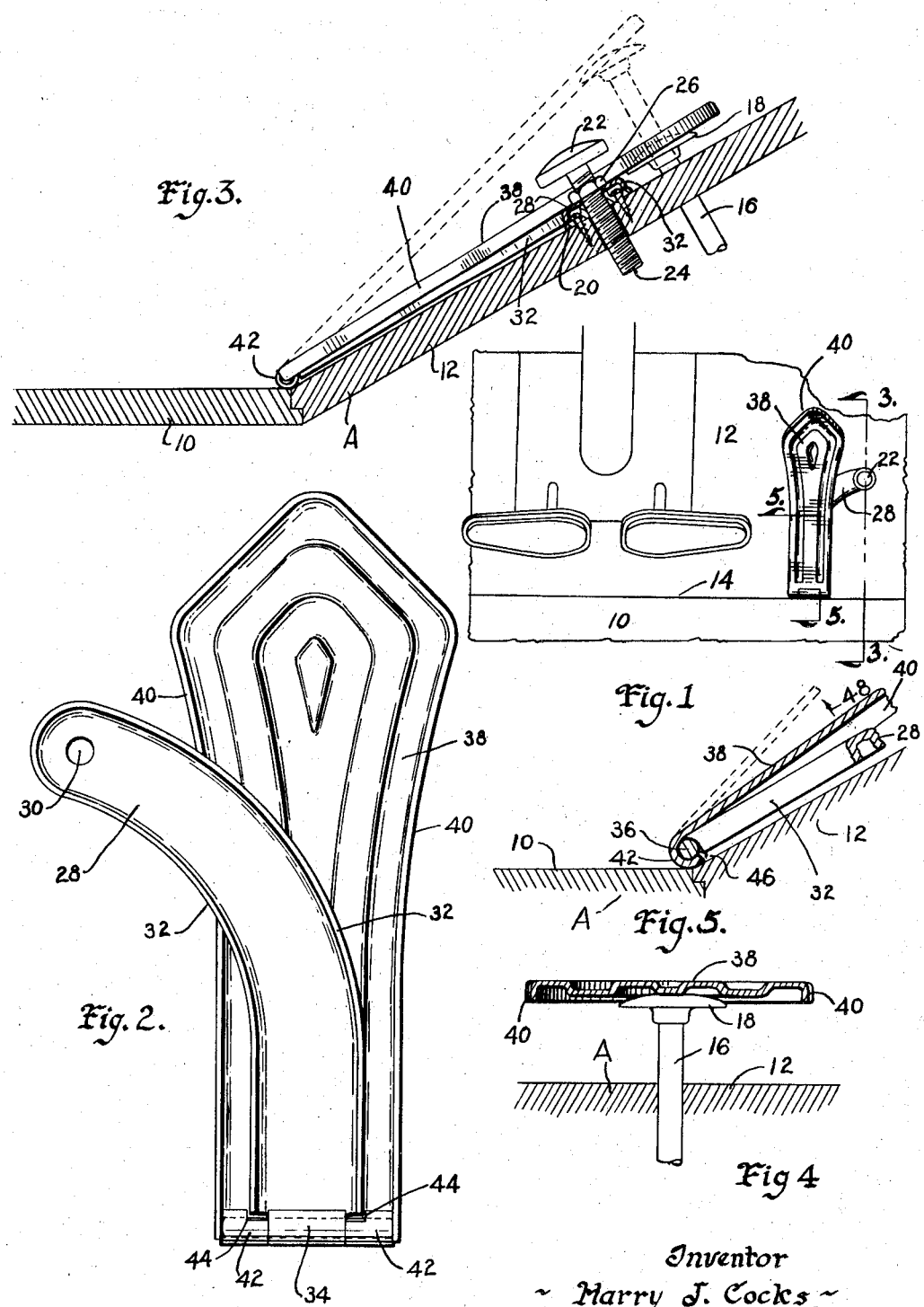

1,813,279

UNITED STATES PATENT OFFICE

HARRY J. COCKS, OF DES MOINES, IOWA, ASSIGNOR TO METAL PRODUCTS COMPANY, OF DES MOINES, IOWA

ACCELERATOR PUSH ROD CONTROL

Application filed July 29, 1929. Serial No. 381,952.

The object of my invention is to provide an accelerator push rod control of simple, durable and comparatively inexpensive construction.

More particularly, it is my object to provide an accelerator control device adapted to be mounted in position upon the floor boards of an automobile by connection with the normal foot rest button, whereby the accelerator control is held in position against undesired movement.

It will be noted that in automobiles the floor boards are arranged both in a horizontal and in an inclined plane. The push rod of the accelerator is normally provided in the inclined portion of the floor boards and it is my object to so provide an accelerator push rod control that by use of the single connection with the inclined floor boards, the entire device is held against pivotal movement, due to the fact that the lower edge of the foot control is arranged to lie at a point which forms the junction between the inclined floor boards and the vertical floor boards.

Still a further object is to provide an accelerator control that is pivotally connected with its support and adapted for a limited amount of movement only.

With these and other objects in view, my invention consists in the construction, arrangement and combination of the various parts of my accelerator push rod control, whereby the objects contemplated are attained, as hereinafter more fully set forth, pointed out in my claims, and illustrated in the accompanying drawings, in which:

Figure 1 is a top plan view of portions of the floor boards of an automobile with my foot control mounted thereon.

Figure 2 is an underside view of the control by itself.

Figure 3 is a sectional view taken on the line 3—3 of Figure 1 with the accelerator control shown in its down position in solid lines and in its raised position by dotted lines.

Figure 4 is a detail, sectional view through a portion of the foot accelerator control showing how it engages the push rod of the accelerator; and Figure 5 is a detail, sectional view taken on the line 5—5 of Figure 1, illustrating the construction of the control and how the pivotal movement of one of the members relative to its support is limited.

In the accompanying drawings, I have used the reference character A to indicate generally the floor boards of an automobile. Some of the floor boards are arranged in a horizontal plane, as are the floor boards 10, while the floor boards 12 are arranged in an inclined plane.

The junction between the horizontal floor boards 10 and the inclined floor portion 12 forms a corner as at 14.

Extending through the inclined floor boards 12 is an accelerator push rod 16 having a head 18 thereon. A plate 20 having a screw-threaded opening therein is positioned upon the inclined floor boards 12 adjacent the push rod 16. A foot rest button 22 having a screw-threaded shank 24 extends through the plate 20 and is locked in position by a nut 26.

The parts just described form the normal arrangement found upon substantially all makes of automobiles and particularly the Ford.

My improved accelerator push rod control includes a bracket 28 of sheet metal construction and formed over dies. The bracket 28 is curved in outline as clearly shown in Figure 2 of the drawings. One end thereof is provided with an opening 30.

In order to provide a substantially rigid bracket or a structure which is comparatively strong and not easily bent, I arrange a pair of down-turned flanges 32 along the marginal edges of the bracket itself.

The end of the bracket opposite the opening 30 is provided with a coiled or looped portion 34, so as to provide an eye for a pintle rod 36. The pintle rod 36 is securely held in position by the looped material 34 of the bracket 28.

Connected to the pintle rod 36 is a foot control rest 38, which is substantially elongated in outline and is provided with down-turned flanges 40 for reinforcing the same.

The surface of the foot control rest 38 may be fabricated or so formed as to provide a plurality of ridges and recesses for giving the entire device a neat appearance and at the same time giving it rigidity and strength.

The end of the foot control rest 38, which is in engagement with the pintle rod 36 is formed with a pair of spaced loops 42, which extend around the pintle rod 36 as clearly shown in Figure 5 of the drawings.

A portion of the looped ends 42 is notched as at 44. The purpose of the notches 44 will now be described.

It is desirable to limit the amount of pivotal movement of the control rest 38 relative to the bracket 28 and for that reason the notches 44 provide an edge 46 which engages the down-turned flange 32 of the bracket 28. When the foot rest 38 is swung upon its pintle in the direction indicated by the arrow 48, then and thereafter the edge 46 of the material forming the loop 42 will engage the lower edge of the flange 32 and thus serve as a stop for limiting the amount of pivotal movement of the foot rest 38.

It will be noted that when the parts are assembled that one end of the bracket 28 is projected out beyond the side of the foot rest 38.

Installation

In order to install my device in position, it is necessary to first remove the foot rest button 22. The bracket 28 is positioned over the plate 20 so that the opening 30 is in alignment with the screw-threaded opening in the plate 20. The button rest 22 is then inserted through the opening 30 and through the opening formed in the plate 20. The nut 26 is screwed down, so that it rests against the upper surface of the bracket 28.

The bracket 28 is thus securely mounted upon the inclined floor boards 12 through the medium of the button rest 22.

The forward end of the accelerator control rest 38 is then positioned so that it engages the upper surface of the head 18 of the push rod 16.

It will be noted that the lower end of the control rest 38 adjacent the hinge connection thereof with the bracket 28 is in alignment with the junction 14, so that after the bracket 28 is securely mounted on the floor boards, there is very little chance of pivotal movement of the entire assembly, due to the fact that the lower edge of the device rests within the junction or corner 14 formed between the floor boards 10 and 12.

The accelerator control rest 38 is so positioned that when it is pushed downwardly, it likewise pushes the rod 16 downwardly for operating the accelerator.

It will be noted that the push rod 16 is normally held in a raised position relative to the floor boards 12 due to springs, and the like, which are normally provided for use in connection with accelerator push rods.

The foot control 38 normally assumes the position shown in dotted lines in Figure 3 of the drawings, and it is only when the accelerator push rod 16 is pushed downwardly that the parts will assume the position shown in solid lines in Figure 3.

The foot rest button 22 after the device is installed may be used just as though the device were not there positioned.

Some changes may be made in the arrangement and construction of the accelerator push rod control, without departing from the real spirit and purpose of my invention, and it is my intention to cover by my claims, any modified forms of structure or use of mechanical equivalents, which may be reasonably included within their scope.

I claim as my invention:

1. For use with an accelerator push rod having a foot rest mounting at the side thereof, an accelerator pedal and a bracket therefor, said bracket having one end secured to said foot rest mounting and its other end substantially spaced rearward and sideward from said first end and located rearward of said accelerator pedal, one end of said accelerator pedal being hinged to the second-mentioned end of the bracket and its other end engaging said push rod whereby said pedal is in substantial alignment with the foot of a driver when using said pedal.

2. For use with an accelerator push rod having a foot rest mounting at the side thereof, an accelerator pedal having one end to engage said push rod and a hinged connection at its other end and positioned substantially rearward of the push rod engaging end whereby said pedal is in substantial alignment with the foot of a driver, and a bracket having one end included in said hinge connection and its other end extending forward and sideward to said foot rest mounting and means for securing the bracket thereto.

Des Moines, Iowa, June 25, 1929.

HARRY J. COCKS.